Patented Feb. 9, 1954

2,668,798

UNITED STATES PATENT OFFICE 2,668,798

CRACKING CATALYST REACTIVATION

Charles J. Plank, Woodbury, N. J., assignor to Socony-Vacuum Oil Company, Incorporated, a corporation of New York No Drawing. Application December 28, 1951,
Serial No. 263,957

7 Claims. (Cl. 252—413)

This invention relates to a process for reactivating a catalytic composite useful in the conversion of higher boiling hydrocarbons to lower boiling hydrocarbons, such as gasoline. More particularly, the present invention is concerned with a method for reactivating siliceous cracking catalysts which have become poisoned during alternate cracking and regeneration operations by the contaminating effects of minute amounts of nickel.

Siliceous cracking catalysts, including naturally-occurring activated clays and synthetically prepared composites have long been recognized as useful in catalytically promoting hydrocarbon conversion reactions. Such siliceous catalysts contain silica and one or more metal oxides. In clays, the metal oxide present is alumina. Active synthetic cracking catalysts are generally gels or gelatinous precipitates and include silica-alumina, silica-zirconia, silica-beryllia, silica-magnesia, as well as ternary combinations such as silica-alumina-zirconia, silica-alumina-beryllia, silica-alumina-magnesia. Ordinarily, this type of catalyst contains silica and at least one material selected from the group, alumina, zirconia, beryllia, and magnesia. Other metal oxides may also be present, if desired, generally in small percentage, such as manganese, chromium, titanium, tungsten, molybdenum, and calcium. Synthetic siliceous cracking catalysts may be prepared by various well-known methods such as by co-gellation or co-precipitation of the silica and metal oxide or by milling together the separately precipitated or gelled components. Alternatively, the metal oxide may be combined with a previously formed siliceous gel utilizing impregnation or base-exchange techniques. The present invention, however, is not limited to catalysts prepared by any particular method, but is of general application to siliceous cracking catalysts. It will thus be understood that the catalysts undergoing treatment in accordance with the present invention may be any of the siliceous cracking catalysts heretofore customarily employed which are susceptible to poisoning by the presence of nickel contaminant. It will further be understood that the reactivation treatment described herein is performed on catalysts which have previously been utilized for the conversion of hydrocarbons. Both the natural and synthetic siliceous cracking catalysts appear to be effected in generally the same manner and to be substantially fully equivalent in undergoing the reactivation treatment of the present invention.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. This cracking reaction results in deposition of a carbonaceous deposit, commonly called coke, with consequent decline in catalytic activity of the catalyst. Under conditions to obtain efficient operation from a yield standpoint, it is found desirable to terminate the cracking reaction after a relatively short conversion run, for example, of from 5 to 15 minutes on stream and to thereafter restore the activity of the catalyst by burning off the coke in a regeneration stage. The formation of coke represents a net loss since hydrocarbons are consumed in its production. In addition, it is apparent that the greater the coke deposit, the longer the regeneration period would have to be in proportion to the on-stream period in order not to exceed detrimental temperature levels during regeneration.

It has been found that minute amounts of nickel are highly detrimental to the efficiency of the siliceous cracking catalysts above described. Such catalysts contaminated even with an extremely small amount of nickel exhibit decreased activity and excessive coke formation during cracking reactions. In fact, commercial experience with such poisoned catalysts shows about 50 percent more coke make by the catalyst at equilibrium activity than is produced by the catalyst in unpoisoned condition. Furthermore, since the major portion of the catalyst remains in the cracking system over an extended period of time with recirculation, the amount of nickel contaminant gradually builds up to such point that further contact of the cracking charge with the catalyst becomes an uneconomical operation. It would appear that the nickel contaminant is introduced with the charge stock or it may be eroded from the equipment. Regardless of its manner of introduction, the presence of nickel contaminant in the siliceous cracking catalyst employed is definitely detrimental, leading to the production of an excessive amount of coke.

It is a major object of this invention to overcome the difficulties caused by the poisoning effects of nickel contaminant on the conversion efficiency of siliceous cracking catalysts. A more specific object is the provision of a method for reducing excessive coke formation on siliceous cracking catalysts contaminated with minute amounts of nickel. A further object is to provide a process for reactivation of such contaminated catalysts.

The above and other objects which will be apparent to those skilled in the art are achieved by the process described herein. Broadly, the present invention involves reactivation of a nickel-poisoned siliceous cracking catalyst by subjecting the same to a mild acid treatment followed by a mild steam treatment. Such method of treatment under conditions set forth hereinafter has been discovered to afford a surprisingly low coke-forming catalyst.

The catalysts reactivated in accordance with the present invention include both synthetic and natural siliceous composites containing a major proportion of silica and a minor proportion of one or more metal oxides as described above. The catalysts treated in accordance with the present process are further characterized by the presence therein of a small amount of nickel contaminant. Generally, a very minute amount of nickel as low as 0.006 percent by weight of the catalytic composite will exert a detrimental poisoning effect on the cracking characteristics of the described siliceous cracking catalysts. Composites containing an amount of nickel in excess of about 0.20 percent by weight do not readily respond to the reactivating treatment described herein and it is accordingly not contemplated that siliceous catalysts which may be contaminated with quantities of nickel greater than about 2000 parts per million will be treated in accordance with the present process. As a general rule, the siliceous catalysts undergoing reactivation will contain between about 0.01 and about 0.05 percent by weight of nickel contaminant.

In practice of the invention, a nickel-poisoned siliceous cracking catalyst, which has been previously employed in catalytic conversion of high boiling oils to gasoline, is subjected to treatment with an acid solution. The treatment may be carried out either batchwise, in which case the catalyst is permitted to remain in the acid solution under generally static conditions for a predetermined length of time and then removed therefrom, or treatment may be effected by continuously percolating acid solution through a bed of the catalyst. The strength of the acid-treating solution, the time of treatment, and the temperature of treatment are interrelated variables. Time and temperature conditions for satisfactory reactivation of the poisoned catalyst vary inversely with the concentration of acid solution. The proper selection of acid strength, time and temperature of treatment will depend on the extent of deactivation of the catalyst undergoing treatment and on the choice of one of these three variables. Thus, if it is desired to complete acid treatment in a relatively short period of time, the temperature and concentration of the acid solution should be relatively high. On the other hand, if a comparatively dilute acid solution is employed, a correspondingly longer time of treatment will be required. In view of the foregoing, it is extremely difficult to establish the exact limiting conditions under which acid treatment will be carried out in accordance with the present process. In general, however, the concentration of acid solution employed is in the range of 1 to 50 percent; the time of treatment is at least about 1 hour and may extend over a considerable period ordinarily not exceeding about 200 hours; the temperature of treatment may range from room temperature of about 60° F. upwards and usually will not be greater than about 250° F.

The acid may be either a mineral acid such as sulfuric, nitric, hydrochloric, phosphoric, etc. or an organic acid such as acetic, oxalic, tartaric, and the like. Aside from strength considerations, the particular acid employed appears to have little variation of effect in achieving the desired catalyst reactivation. Ordinarily, more concentrated solutions of the weaker organic acids will be necessitated as compared with less concentrated solutions of the stronger mineral acids in accomplishing a comparable degree of reactivation. From a practical commercial standpoint, a mineral acid, and particularly sulfuric acid and hydrochloric acid are accorded preference.

After acid treatment, the catalyst is water-washed to remove excess anions. The extent of washing required is determined by the acid used. Sulfates and chlorides require rather extensive washing for fairly complete removal; nitrates and organic anions can be removed sufficiently by washing to a smaller degree. When the catalyst has been substantially washed free of excess acid anions, it is dried, calcined and then subjected to mild steam treatment.

The exposure of the previously acid-treated catalyst to steam is, as will appear from data set forth hereinafter, a necessary step in the present reactivation procedure. Steam treatment may be carried out at a temperature within the appropriate range of 800 to 1500° F. for at least about 2 hours. Usually steam at a temperature of about 1000 to 1300° F. will be used with the treating period extending from about 2 to about 48 hours. Temperatures above 1500° F. and generally above 1300° F. for the clay catalysts may be detrimental and should be avoided. Optimum improvement has been obtained by treatment at about 1100° F. for about 24 hours at atmospheric pressure in a 100 percent steam atmosphere. As long as critically high temperatures, which cause rapid shrinkage or sintering of the catalyst, are avoided, longer periods of treatment than above designated apparently have no adverse effect. Also, an atmosphere consisting of a substantial amount of steam, say at least about 10 percent by volume, but containing air or other gas substantially inert with respect to the composite being treated may be used, and such mixtures are, in fact, desirable with the use of the more elevated temperatures to avoid possible deactivation of the catalyst.

After the above-described acid treatment and steam treatment, the catalyst is in a reactivated state and may be returned to the conversion chamber of the cracking unit for further use in catalytically promoting the conversion of higher boiling hydrocarbons to hydrocarbons boiling in the range of gasoline.

A siliceous cracking catalyst containing approximately 90.85 percent $SiO_2$, 9 percent $Al_2O_3$ and 0.15 percent $Cr_2O_3$ was utilized in a compact moving bed catalytic cracking unit over a period of 141 days for approximately 5–6 cycles a day of alternate conversion and regeneration for the cracking of a mixture of California virgin gas oils. The catalyst, after such use, was found to be poisoned, and the poisoning effects were discovered to be due to the presence in the catalyst of a minute amount of nickel to the extent of about 0.01 percent by weight. Experiments to reactivate the poisoned catalyst were carried out as in the following examples:

*Example 1*

A sample of the poisoned catalyst was treated for 24 hours at 1100° F. with 100% steam. A substantial reduction in coke formation with no reduction in catalytic activity was produced as shown in Table I.

*Example 2*

A 350 cc. batch of the poisoned catalyst was placed in a 40 mm. tube and 5% sulfuric acid was percolated through the bed at a rate of approximately 240 cc./hr. for 100 hours at room temperature. The product was then washed free of sulfate and dried. A test of its catalytic activity gave the results shown in Table I. From the results, it is seen that the acid treatment in itself had very little effect on the activity or product distribution of the catalyst. If any effect occurred, it was to give a slightly poorer distribution since the gas make was noticeably higher and the coke slightly higher.

*Example 3*

The catalyst of Example 2 was then steam-treated 24 hours at 1100° F. and a new test of its catalytic activity made. The data given in Table I show that this catalyst gives a much lower coke make than the catalyst of Example 1. That the effect is not a transient one but, rather, is stable is shown by the fact that these data showed very little variation over 26 cracking cycles.

*Examples 4 to 15*

Table I shows a number of examples of treatments which involve acid treating in a manner analogous to Example 2 (but with varying acid strength, time and temperature of treatment) followed by steam treating at 1100° F. for 24 hours. From these data, it is clearly seen that by acid-treating siliceous cracking catalysts which have been nickel-poisoned and following that with a mild steam treatment, the coke make of the catalyst is reduced to 40–45 percent of its original value. Furthermore, this coke make is only 55–65 percent of that given when the catalyst is steam-treated alone. It will be noted that a 5-hour treatment in a Soxhlet extractor with constant-boiling HCl gives results very similar to those of the various sulfuric acid treatments when followed with steam at 1100° F.

*Example 16*

A siliceous synthetic gel cracking catalyst containing about 91 percent $SiO_2$ and about 9 percent $Al_2O_3$ and contaminated with about 75 p. p. m. of nickel was tested in the standard Cat-A activity test. The product gave very high coke yields both before and after steam treatment, as shown in Table II.

The steam treated material was then contacted with a 5% $H_2SO_4$ solution for 24 hours at room temperature and again tested in the Cat-A test. As shown by the results of Table II, the gasoline/coke ratio is only slightly improved by the acid treatment alone. However, after a subsequent steam treatment, the gasoline/coke ratio was greatly improved and was equivalent to that for the normal non-poisoned catalyst.

*Example 17*

A siliceous clay cracking catalyst of the acid-activated montmorillonite type contaminated with about 224 p. p. m. of nickel was tested in the standard Cat-A Activity Test. The product both before and after steam treatment gave very high coke yields. The steam treated material was then contacted with a 5% aqueous solution of $H_2SO_4$ for 24 hours at room temperature. The results of Cat-A tests are set forth in Table II. As will be evident, the acid treatment alone gave improvement in gasoline yield but no decrease in coke formation. However, after a subsequent steam treatment, the gasoline/coke ratio was very greatly improved.

TABLE II

| Example | Acid Treatment | Steam Treatment [1] | Gas, Gravity | Gas, Wt. Percent | Coke, Wt. Percent | Gasoline, Vol. Percent, 410° F., E. P. |
|---|---|---|---|---|---|---|
| 16 | None | None | 1.14 | 8.7 | 3.7 | 36.6 |
|  | ....do.... | Yes | 1.44 | 7.0 | 2.6 | 34.7 |
|  | Batch Treat.—5% $H_2SO_4$ for 24 Hrs., Room Temp. | None | 1.42 | 8.2 | 2.4 | 35.2 |
|  | ....do.... | Yes | 1.45 | 5.9 | 1.5 | 31.3 |
| 17 | None | None | 0.83 | 8.4 | 5.3 | 29.9 |
|  | ....do.... | Yes | 0.85 | 4.9 | 2.9 | 25.6 |
|  | Batch Treat.—5% $H_2SO_4$ for 24 Hrs., Room Temp. | None | 1.05 | 5.8 | 3.1 | 29.4 |
|  | ....do.... | Yes | 1.11 | 4.5 | 2.2 | 28.4 |

[1] Steam-treated 10 hours at 1200° F. with 100% steam.

It is to be understood that the above description is merely illustrative of preferred embodiments of the invention. While such description has been directed particularly to the reactivation of nickel poisoned siliceous cracking catalysts, it is contemplated that the method set

TABLE I

| Example | Acid Treatment | Steam Treatment [1] | Gas, Gravity | Gas, Wt. Percent | Coke, Wt. Percent | Gasoline, vol. percent, 410° F., E. P. |
|---|---|---|---|---|---|---|
| Blank | None | None | 1.09 | 6.7 | 2.5 | 29.2 |
| 1 | ....do.... | Yes | 1.25 | 4.6 | 1.8 | 30.9 |
| 2 | Continuous Acid Treat (5% $H_2SO_4$), 100 hrs. at room temp. | No | 1.16 | 7.7 | 2.6 | 30.6 |
| 3 | ....do.... | Yes | 1.30 | 3.3 | 1.0 | [2] 27.6 |
| 4 | Soxhlet Extn. 20% HCl—5 hrs. at 230° F | Yes | 1.38 | 2.6 | 0.9 | 27.5 |
| 5 | Batch treat—5% $H_2SO_4$ for 8 hrs., room temp. | Yes | 1.42 | 5.2 | 1.5 | 29.2 |
| 6 | Batch treat—5% $H_2SO_4$ for 24 hrs., room temp. | Yes | 1.44 | 3.6 | 1.3 | 29.9 |
| 7 | Batch treat—5% $H_2SO_4$ for 48 hrs., room temp. | Yes | 1.47 | 3.7 | 1.2 | 29.7 |
| 8 | Batch treat [3]—5% $H_2SO_4$ for 96 hrs., room temp. | Yes | 1.45 | 3.2 | 1.1 | 30.3 |
| 9 | Batch treat—50% $H_2SO_4$/24 hrs., room temp. | Yes | 1.36 | 2.9 | 1.1 | 30.0 |
| 10 | Batch treat—50% $H_2SO_4$—12 hrs., room temp. | Yes | 1.40 | 3.6 | 1.1 | 28.2 |
| 11 | Batch treat—5% $H_2SO_4$—120 hrs. at 185° F | Yes | 1.39 | 2.7 | 1.1 | 27.9 |
| 12 | Batch treat—5% $H_2SO_4$—8 hrs. at 185° F | Yes | 1.43 | 3.2 | 1.2 | 29.5 |
| 13 | Batch treat—10% $H_2SO_4$—4 hrs. at 185° F | Yes | 1.41 | 3.1 | 1.1 | 28.5 |
| 14 | Batch treat—5% $H_2SO_4$—1 hr. at 185° F | Yes | 1.37 | 2.5 | 1.0 | 28.9 |
| 15 | Batch treat—50% $H_2SO_4$—2 hrs. at 185° F | Yes | 1.30 | 3.3 | 1.0 | 28.7 |

[1] Steam-treated 24 hours at 1100° F. with 100% steam.
[2] Av. for 26 cycles.
[3] The acid batches were approximately equal in volume to the catalyst batches. In this case, the acid was replaced once after 48 hours.

forth may likewise be applicable for reactivation of various other catalytic composites which have become poisoned by the presence therein of metal contaminants such as copper, iron, vanadium, and the like.

I claim:

1. A method for reactivating a siliceous cracking catalyst which has been poisoned by a small contaminating amount, less than about 0.20 percent by weight, of nickel during the conversion of high boiling petroleum hydrocarbons to hydrocarbons boiling in the gasoline range, which comprises contacting said poisoned catalyst with a dilute mineral acid solution, removing the catalyst from contact with said solution, washing excess acid therefrom and subjecting the catalyst to steam treatment at a temperature in the range of about 1000 to about 1300° F. for a period of between about 2 and about 48 hours.

2. A method for reactivating a siliceous cracking catalyst which has been poisoned by a small contaminating amount, less than about 0.20 percent by weight, of nickel during the conversion of high boiling petroleum hydrocarbons to hydrocarbons boiling in the gasoline range, which comprises contacting said poisoned catalyst with an acid solution of less than 50 percent concentration for a period of at least about 1 hour, removing the catalyst from contact with said acid solution, washing excess acid therefrom and subjecting the same to steam treatment at a temperature in the range of about 800 to about 1500° F. for at least about 2 hours.

3. A method for reactivating a siliceous cracking catalyst which has been poisoned by a small contaminating amount, less than about 0.20 percent by weight, of nickel during the conversion of high boiling petroleum hydrocarbons to hydrocarbons boiling in the gasoline range, which comprises contacting said poisoned catalyst with a dilute acid solution, removing the catalyst from contact with said acid solution, washing excess acid therefrom and subjecting the same to steam treatment at a temperature in the range of about 800 to about 1500° F. for at least about 2 hours.

4. A method for reactivating a siliceous cracking catalyst which has been poisoned by a small contaminating amount, less than about 0.20 percent by weight, of nickel during the conversion of high boiling pertroleum hydrocarbons to hydrocarbons boiling in the gasoline range, which comprises contacting said poisoned catalyst with a mineral acid solution of concentration between about 1 and about 50 percent by weight for a period of between about 1 and about 200 hours at a temperature between about 60° F. and about 250° F., removing the catalyst from contact with said acid solution, washing excess acid therefrom and subjecting the catalyst to steam treatment at a temperature in the range of about 1000 to about 1300° F. for a period of between about 2 and about 48 hours.

5. A method for reactivating a synthetic silica-alumina gel cracking catalyst contaminated by a minute amount of less than about 0.20 percent by weight of nickel, which comprises contacting said contaminated catalyst with a dilute acid solution for at least about 1 hour, removing the catalyst from contact with said acid solution, washing excess acid therefrom and subjecting the acid-treated catalyst to steam treatment at a temperature in the range of about 800 to about 1500° F. for at least about 2 hours.

6. A method for reactivating a natural silica-alumina catalyst contaminated by a minute amount of less than about 0.20 percent by weight of nickel, which comprises contacting said contaminated catalyst with a dilute acid solution for at least about 1 hour, removing the catalyst from contact with said acid solution, washing excess acid therefrom and subjecting the acid-treated catalyst to steam treatment at a temperature in the range of about 800 to about 1500° F. for at least about 2 hours.

7. A method for reactivating a silica-alumina cracking catalyst contaminated by a minute amount of less than about 0.20 percent by weight of nickel, which comprises contacting said contaminated catalyst with a dilute acid solution for at least about 1 hour, removing the catalyst from contact with said acid solution, washing excess acid therefrom and subjecting the acid-treated catalyst to steam treatment at a temperature in the range of about 1000 to about 1300° F. for a period of between about 2 and about 48 hours.

CHARLES J. PLANK.

References Cited in the file of this patent

UNITED STATES PATENTS

| Number | Name | Date |
|---|---|---|
| 2,375,757 | Bates | May 15, 1945 |
| 2,380,731 | Drake et al. | July 31, 1945 |

OTHER REFERENCES

Mills: "Aging of Cracking Catalysts," Ind. & Eng. Chem., vol. 42, pgs. 182–187, January 1950.